(12) United States Patent
Volkov et al.

(10) Patent No.: US 10,523,660 B1
(45) Date of Patent: *Dec. 31, 2019

(54) ASSERTING A MOBILE IDENTITY TO USERS AND DEVICES IN AN ENTERPRISE AUTHENTICATION SYSTEM

(71) Applicant: MOBILEIRON, INC., Mountain View, CA (US)

(72) Inventors: Alexei Volkov, Mountain View, CA (US); Kumara Das Karunakaran, Milpitas, CA (US); Vijay Pawar, Palo Alto, CA (US)

(73) Assignee: MOBILEIRON, INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/257,654

(22) Filed: Jan. 25, 2019

Related U.S. Application Data

(63) Continuation-in-part of application No. 15/595,648, filed on May 15, 2017.

(60) Provisional application No. 62/622,715, filed on Jan. 26, 2018, provisional application No. 62/336,451, filed on May 13, 2016.

(51) Int. Cl.
*H04L 29/06* (2006.01)

(52) U.S. Cl.
CPC .................. *H04L 63/0823* (2013.01)

(58) Field of Classification Search
CPC .............. H04L 63/0823; H04L 63/0815
USPC .............................................. 713/150
See application file for complete search history.

(56) References Cited

U.S. PATENT DOCUMENTS

| | | | |
|---|---|---|---|
| 8,621,216 B2 | 12/2013 | Husa | |
| 8,776,209 B1 | 7/2014 | Kumar | |
| 9,053,304 B2 | 6/2015 | Ronda | |
| 9,098,850 B2 | 8/2015 | Weiner | |
| 9,203,814 B2 | 12/2015 | Perez | |
| 9,571,457 B1 | 2/2017 | Hoy | |
| 9,646,150 B2 * | 5/2017 | Toth | H04L 63/08 |
| 9,736,145 B1 * | 8/2017 | Hayes | H04L 63/0823 |
| 9,923,897 B2 * | 3/2018 | Houston | H04L 63/10 |
| 10,116,644 B1 * | 10/2018 | Agrawal | H04L 63/0815 |

(Continued)

FOREIGN PATENT DOCUMENTS

| | | |
|---|---|---|
| WO | 2010115607 | 10/2010 |
| WO | 2015154066 | 10/2015 |

OTHER PUBLICATIONS

Author Unknown. Dev Overview of OpenID Connect. 2015.

*Primary Examiner* — Lynn D Feild
*Assistant Examiner* — Viral S Lakhia
(74) *Attorney, Agent, or Firm* — Van Pelt, Yi & James LLP

(57) ABSTRACT

In an embodiment, a system for asserting a mobile identity to users and devices in an enterprise authentication system includes a communication interface and a processor coupled to the interface. The processor is configured to receive, via the communication interface and from a first device, a request to authenticate a user to a service using a unique identity associated with a second device. The processor is configured to determine, based at least in part on the unique identity, an identity certificate associated with the request, generate an identity assertion based at least in part on the identity certificate, and provide the identity assertion via the communication interface to a requesting node with which the request to authenticate is associated.

17 Claims, 5 Drawing Sheets

(56) References Cited

U.S. PATENT DOCUMENTS

| | | | |
|---|---|---|---|
| 2011/0213956 A1 | 9/2011 | Mukkara | |
| 2011/0214176 A1 | 9/2011 | Burch | |
| 2013/0219479 A1* | 8/2013 | DeSoto | H04W 12/06 726/6 |
| 2014/0181504 A1* | 6/2014 | Almahallawy | H04L 63/062 713/156 |
| 2016/0191567 A1* | 6/2016 | Chahal | H04W 12/00 726/1 |
| 2016/0285858 A1 | 9/2016 | Li | |
| 2016/0292694 A1* | 10/2016 | Goldschlag | H04L 63/20 |
| 2016/0308851 A1* | 10/2016 | Tiwari | H04L 63/0823 |
| 2016/0314299 A1* | 10/2016 | Almer | G06F 21/6218 |
| 2017/0054721 A1* | 2/2017 | Meriac | H04L 63/10 |
| 2017/0180351 A1* | 6/2017 | Lu | H04L 63/061 |
| 2018/0115547 A1* | 4/2018 | Peterson | H04L 63/08 |
| 2018/0295134 A1 | 10/2018 | Gupta | |

\* cited by examiner

200

At the Unmanaged Device

Interaction Page 410

Interaction Page 420

Interaction Page 450

At the Managed Device

Authenticator App 430

Authenticator App 460

Authenticator App 470

500

ASSERTING A MOBILE IDENTITY TO USERS AND DEVICES IN AN ENTERPRISE AUTHENTICATION SYSTEM

CROSS REFERENCE TO OTHER APPLICATIONS

This application claims priority to U.S. Provisional Patent Application No. 62/622,715 entitled ASSERTING A MOBILE FIRST IDENTITY TO USERS AND DEVICES IN AN ENTERPRISE AUTHENTICATION SYSTEM filed Jan. 26, 2018. This application is a continuation-in-part of U.S. patent application Ser. No. 15/595,648 entitled UNIFIED VPN AND IDENTITY BASED AUTHENTICATION TO CLOUD-BASED SERVICES filed May 15, 2017, which claims the benefit of U.S. Provisional Patent Application No. 62/336,451 entitled UNIFIED VPN AND IDENTITY BASED AUTHENTICATION TO CLOUD-BASED SERVICES filed May 13, 2016. The above-mentioned applications are incorporated herein by reference for all purposes.

BACKGROUND OF THE INVENTION

Virtual Private Networks (VPNs) are a common means of establishing trust and user identity within corporate networks. The application of VPNs to mobile devices has made it possible for enterprises to get the same level of trust from mobile devices. However, many enterprise productivity applications reside outside conventional enterprise network boundaries, in cloud-based services. There is therefore a need to be able to access these services securely too, without having to establish their user identity individually with each service (most commonly by entering passwords to login to each such service).

VPNs typically establish user identity through the use of a pre-established secure credential on the user's device that is unlocked by the user entering a password or PIN, or more recently through biometrics, such as using the device to read a fingerprint. Such credentials are commonly in the form of PKI keys and certificates provisioned on the devices with the help of an Enterprise Mobility Management (EMM) solution (also known as a Unified Endpoint Management UEM). Pre-established secure credentials such as passwords typically vary from application to application, and can be cumbersome and difficult to manage especially if a user needs to memorize many passwords.

Users can use their smartphone/mobile device as a physical access device. For example, a service provider provides a mobile application that is installed on the user's physical access device. The mobile application receives a push notification asking the user to verify their identity. The user's physical access device prompts the user to unlock the phone (e.g., enter a password, provide a biometric to a Touch ID® fingerprint sensor, etc.) and approve or deny the request. However, some service providers may have more stringent requirements, and this type of process does not meet their security or privacy standards. For example, a user could install the mobile application on any physical device including those without adequate security controls (e.g., a spouse's device or home mobile device). This means that the user's identity can be verified by anyone in possession of the device. Someone who is not the user is able to unlock the physical device and approve the request even if they are not the user.

In addition, multi-factor use cases are evolving such that asking a user for a password may be considered cumbersome and unnecessary if a physical device can assert the user's identity. Users tends to forget passwords (especially if they are managing many different passwords for different devices), and this reduces their productivity and causes them to take insecure routes to gain access to resources and become productive again.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 4:
FIG. 4 illustrates an example of a graphical user interface obtained in some embodiments.
Figure 4:
Figure 4:
Figure 4:
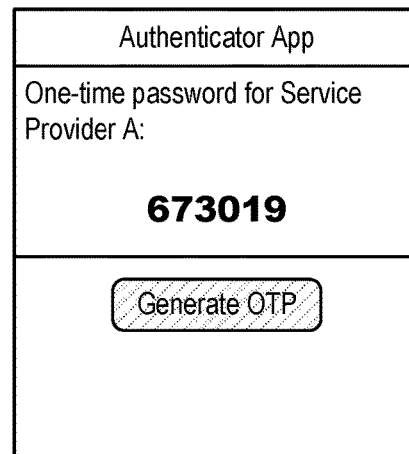
Figure 4:
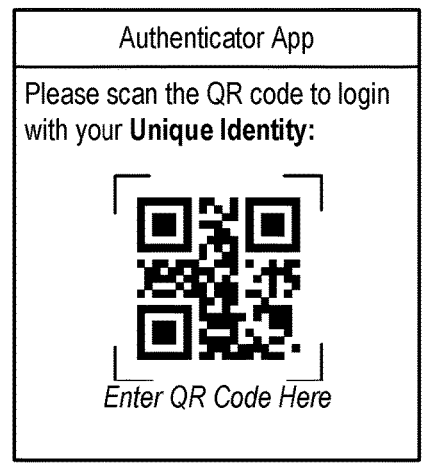
Figure 4:
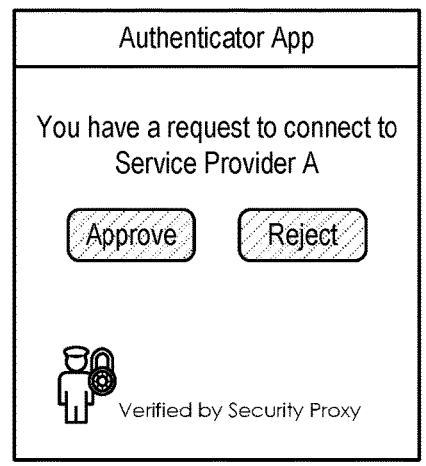
Figure 5:
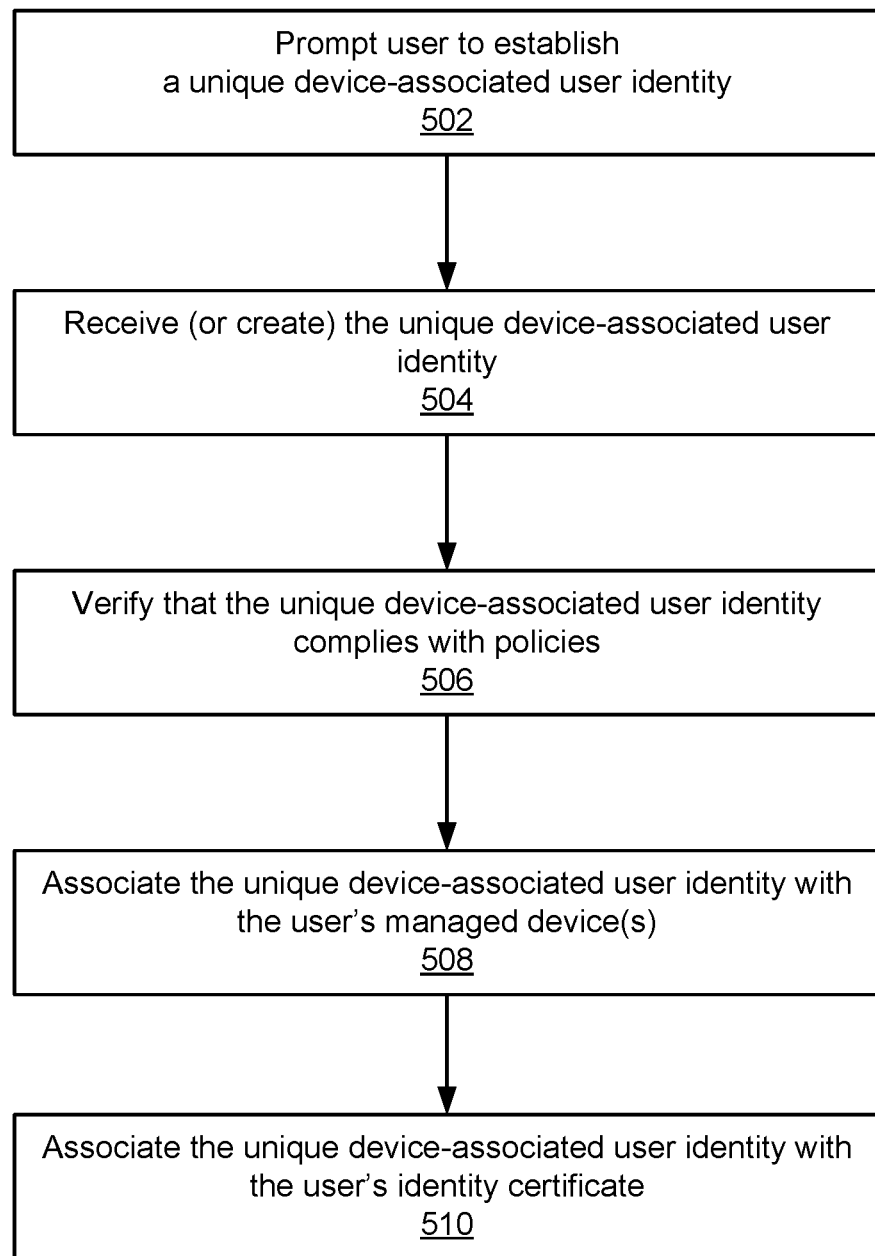
FIG. 5 is a flow chart illustrating an embodiment of a process for establishing a unique identity.

Asserting a mobile device-associated identity in an enterprise authentication system to access a resource from a device other than the mobile device is disclosed. More specifically, the mobile identity includes a unique identity. The unique identity is sometimes called a "unique device-associated user identity," or "mobile identity" herein. Techniques to provide secure access to on-premises and/or cloud-based enterprise resources via the unique identity as disclosed herein are described. In various embodiments, the unique identity is established via a mobile device that is under management (e.g., registered with/via) an Enterprise Mobile Management (EMM) solution. The unique identity is used to authenticate a user to access enterprise resources via one or more other devices, including in various embodiments one or more devices that are not under management. First, an enterprise authentication system and process is described (FIGS. 1-4), then an example of establishing the unique identity is described (FIG. 5).

Figure 1:
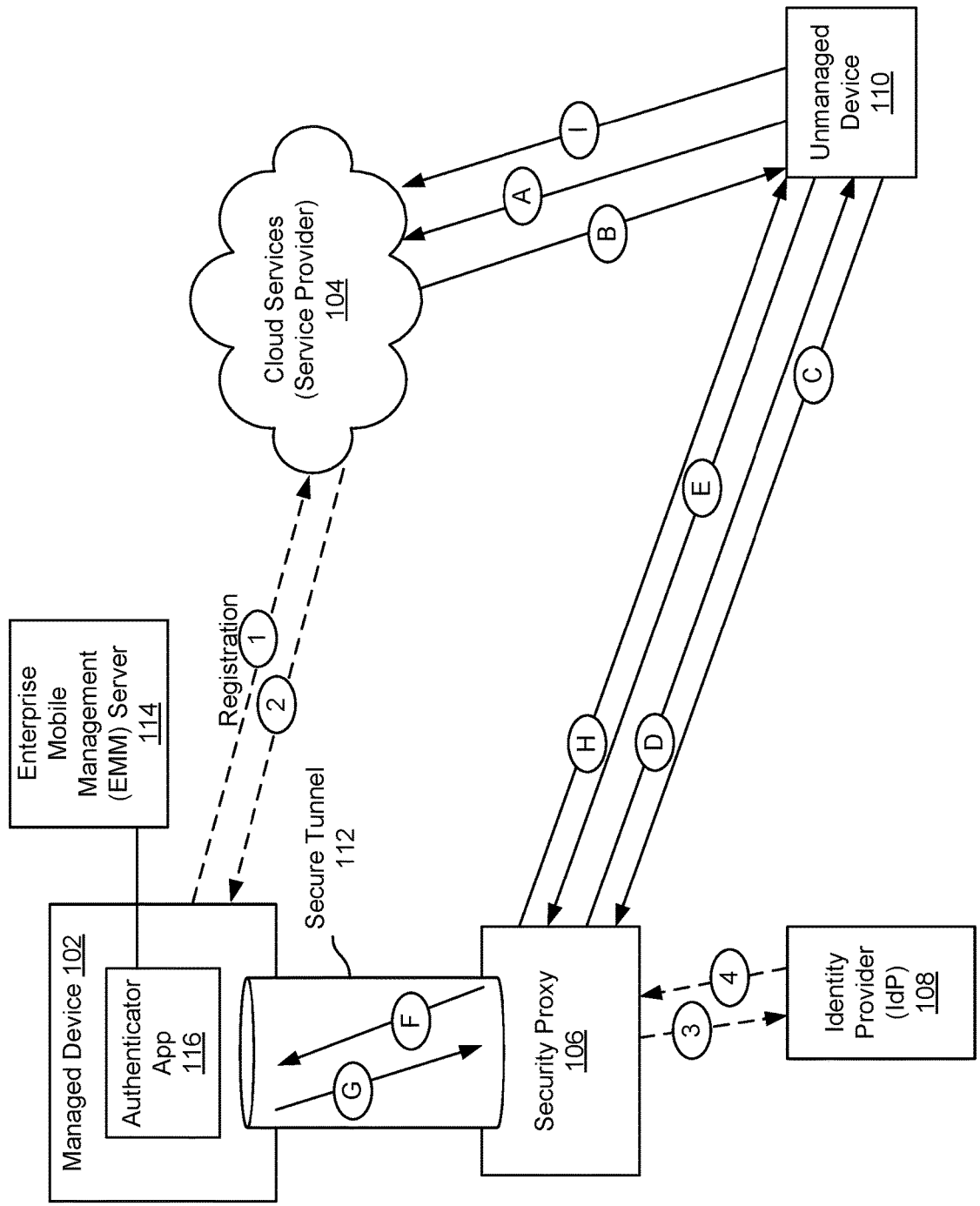
FIG. 1 is a block diagram illustrating an embodiment of a system to perform authentication to a cloud service using a unique identity.

FIG. 1 is a block diagram illustrating an embodiment of a system to perform authentication to a cloud service using a unique identity.

In the example shown, VPN security (such as that offered by MobileIron® Tunnel) is leveraged to establish trust and/or user identity for purposes of user authentication to distributed cloud-based services. In various embodiments, the request to access such a service may be associated with a non-VPN device. In various embodiments, cloud-based services may use various security protocols, such as federated identity standard protocols, e.g. SAML or OAuth. In some embodiments, a mechanism is provided to provide VPN-based authentication to authenticate users in the event a direct VPN connection is not available, e.g., with respect to a device from which access is requested. In some embodiments, the public-key infrastructure (PKI) and the Enterprise Mobility Management (EMM) service that together form the basis of the VPN security may be modified and leveraged to establish authentication to cloud-based services. In some embodiments, certificates associated with VPN may be modified, and/or enterprise directory information may be leveraged in conjunction with such certificates, in order to establish the user's identity with cloud-services.

Most of the cloud-services of interest to enterprise customers support the federated identity standard SAML. Many services also support another federated identity standard—OAuth. When using SAML, cloud-services typically determine the identity provider (i.e. the entity asserting the identity of the user) based on the user's identity, which is based on attributes obtained from the session like a stored cookie. The user's identity can be determined from (e.g., associated with) a user-provided unique identifier as further described below. In various embodiments, an identity provider may use VPN-based authentication to authenticate a user regardless of whether a device via which a request to access a cloud-based service is made is connected via a VPN.

In the example shown, device(s) (managed device 102 or unmanaged device 110) may be used to securely access services, such as enterprise applications, via security proxy 106. For example, security proxy 106 (such as MobileIron® Sentry®) may comprise a secure tunnel 112 or other certificate-based connection. An unmanaged device (device 110) may provide a unique identity (e.g., entered by a user seeking access) to securely access services, such as enterprise applications, via security proxy 106 as further described below. A certificate (identity certificate) may be provisioned on managed devices (device 102), e.g., at device registration. For example, an Enterprise Mobility Management (EMM) server 114 (such as MobileIron® Core or Cloud) may provision the certificate on the device 102. The EMM server may maintain device security posture information, e.g., jail broken or not, unauthorized app installed, etc., and may provide such posture information to the security proxy. One or more agents (secure, EMM-managed apps such as authenticator app 116) on the device 102 may act as agents to provide information relevant to security posture of the device 102, to take action on device 102 in response to a detected security breach, and/or to establish and maintain a secure VPN connection.

In various embodiments a unique identity may be used to authenticate a user to a cloud service, even if the request originates from a device 110 not connected to the VPN (e.g., not managed by EMM 114). In the example shown, device(s) 110 not connected to the security proxy 106, e.g., legacy Windows® operating system based personal computers, unmanaged mobile or other unmanaged devices, etc., may be used to request access to a cloud service 104. In various embodiments, the cloud service 104 may redirect the requesting application to identity provider 108 associated with security proxy 106. In various embodiments, identity provider 108 may use one or more techniques potentially involving security proxy 106 to authenticate the user to the cloud service 104. The techniques described here find application to alternatives to cloud service 104 such as applications that can embed calls to the security proxy 106 to invoke authenticator app 116 (and receive an allow/deny response).

For example, in some embodiments, another device associated with the requesting user and also included among devices 102 associated with security proxy 106 may be used to authenticate the user. For example, in some embodiments, a push notification may be sent by the identity provider 108 to a VPN-connected device 102 associated with the same user. A unique identity associated with the request via a non-VPN device 110 may be mapped to a device 102 on the VPN. Alternatively, the identity provider 108 may prompt the user for such identifying information (a unique identity) that is used to uniquely identify the device 102 for that user. Upon identifying the device 102 for the user, the identity provider 108 may send a push notification to that device. When the user connects via their device 102, a verified identity of the user established via and/or in connection with the security proxy 106 may be used to generate an assertion to authenticate the user to the cloud service 104 to enable access to the cloud service 104 via the non-VPN device 110.

In the example shown in FIG. 1, an access request via a non-VPN-connected device 110 may be processed according to the following sequence, with each lettered paragraph corresponding to a correspondingly labeled arrow in FIG. 1:

A. The user requests access to the cloud-service (service provider) 104 from a device 110 that is not connected to the security proxy 106 (e.g., not managed by EMM 114).

B. The cloud-service 104 requests the user to be authenticated using a unique identity.

C. The user's application (on the device 110) such as browser redirects this request to the security proxy 106.

D. The security proxy 106 takes an action as disclosed herein, which may require user interaction, to establish the user's identity. For example, the security proxy asks the user to provide the unique identity.

E. In various embodiments, a user responds with the unique identity. In some embodiments, a scannable code (e.g., QR code) is used to identify a session on an unmanaged device. The authenticator app 116 scans the code and sends the scanned information (along with other session attributes) via tunnel 112 to the security proxy 106. The scannable code identifies a login session, and the login session is associated with an identity certificate established during registration.

F. The security proxy 106 sends a notification to managed device 102. Put another way, referring to the authentication request represented by arrow "D", although shown as going to the non-VPN device 110 associated with the request, in various embodiments, may be directed to a different device assigned to the same user, such as a VPN-connected device 102, e.g., via a push notification "F". For example, the user may be prompted to indicate approval and/or enter authentication information and/or other identity or presence information via the VPN-connected device 102. Furthermore, additional approvals may be obtained from one or more other users in a single approval, or a quorum or chain based approval, by sending similar push messages to devices of approvers for that user/transaction.

G. The authenticator app 116 reports user consent or denial to the security proxy 106. The user establishes their identity by providing the unique identifier and any additional approvals are received. Put another way, the arrow "E", although shown originating from the non-VPN device 110, may be from a different device assigned to the same user, such as in input from device 102 arriving at security proxy 106.

H. The security proxy 106 generates an assertion for authenticating with the service provider 104. Based on the user's identity, which in some embodiments may be inferred via the VPN and/or established via credentials, e.g., the unique identity, provided at the device 110, the security proxy 106 generates an identity assertion describing the user to the cloud-service 104. In some embodiments, the identity provider 108 generates the identity assertion. This assertion is sent back to the user's application/browser (at the originating device 110) to deliver to the cloud-service 104. The user's application (at the originating device 110) redirects the user with this assertion to the cloud-service 104, which establishes the user's identity within the service 104, based on the assertion presented by the application (which was generated by the security proxy 106 and/or identity provider 108).

I. Via the unmanaged device 110, the user logs into the cloud service 104 site because the browser (in H) received the assertion and the user had been authenticated in H.

In various embodiments, the unique identity can be used in conjunction with one or more techniques to authenticate a user in connection with a request from a non-VPN connected device (e.g., devices 110 of FIG. 1) to access a cloud-based service (e.g., cloud services 104 in FIG. 1). Examples of such techniques include, without limitation, one or more of the following:

1. Inline authentication using certificates;
2. Inline authentication using techniques other than certificates;
3. Enterprise identity provider authentication; and
4. Push notification based authentication.

Inline authentication using certificates. In enterprise environments, PKI certificates and keys may be deployed to devices that may not always be VPN connected. In some embodiments, when a user from a device that is not connected to the VPN but which has been provisioned with an employee PKI key and certificate presents an authentication request to the VPN associated identity provider, the identity provider challenges the user to present proof-of possession of the key corresponding to their employee certificate. This may be done using standard protocols such as TLS with client-authentication. If the user is able to present this proof, then the user is considered to be authenticated, and the identity provider generates an identity assertion to the cloud-based service provider based on this information. The unique identity can be used to look up an associated a certificate or key.

Inline authentication using techniques other than certificates. In some embodiments, the VPN associated identity provider may challenge the user to enter a unique identity that can be verified against an enterprise data source (such as the enterprise employee directory, e.g., Active Directory®) to establish the identity of the user. Some enterprises may configure this to be multi-factor authentication, but in such cases, the identity provider in various embodiments will be able to verify the information presented by the user directly against a source of authentic information from the enterprise.

Enterprise identity provider authentication. In some embodiments, the VPN associated identity provider may act as a federation proxy. When it receives an authentication request from a cloud-service provider, it generates a new authentication request to the enterprise identity provider and redirects the user to it. The enterprise identity provider may employ any secure technique to establish the user's identity by checking the unique identity. If the unique identity is authenticated, the enterprise identity provider generates an identity assertion that it presents to the federated identity provider by redirecting the user's app. The federated identity provider then generates a new assertion based on the information obtained from the identity assertion generated by the enterprise identity provider.

Push notification based authentication. In some embodiments, push notification based authentication, e.g., as described above, may require a client app to be installed on the user's mobile device or other VPN connected device. In some embodiments, the required client app may be obtained by mobile devices through their employer's EMM server and/or enterprise app store. Alternatively, the functionality may be bundled with other device management client apps such as a mobile device management (MDM) agent or app.

Referring further to FIG. 1, in various embodiments, device(s) 102 connected via secure tunnel 112 may be used to access cloud services 104. The connection to the cloud services 104 may or may not be through the security proxy 106. Cloud services 104 may be configured to redirect access requests to an identity provider 108. Device 102 once redirected may communicate with identity provider (IdP) 108 via security proxy 106 to obtain an assertion or other credential to present to the cloud service 104. In various embodiments, a certificate or other credential associated with the device 102's connection via VPN 106 may be used by the identity provider (IdP) 108 to establish the user identity associated with request, and to construct an assertion to authenticate the user to the cloud service 104. In some embodiments, a security posture check may be performed, and the redirected authentication request may be denied or not forwarded based at least in part on security posture information indicating the device 102 is not in a secure posture. The user identity certificate (sometimes called "tunnel certificate") used to secure the secure tunnel 112 has various attributes that describe the user, such as the user's email address, or employee id. In addition, information may be obtained from systems like EMM or other services (like Active Directory or Cloud Service), or a constant value common to a group of users such as company affiliation, usage license, role etc. The IdP provides a flexible way in which customers can specify rules to transform such user identifying information into information that specific cloud service providers expect in federated identity messages in order to uniquely identify the user of that cloud service. Such transformations may include selecting one or more fields, encoding and decoding them in various formats.

In the example shown, device(s) (managed device 102) may be used to securely access services, such as enterprise applications, via security proxy 106. For example, security proxy 106 (such as a MobileIron® Sentry®) may comprise a secure tunnel 112 or other certificate-based connection. A certificate may be provisioned on the device 102, e.g., at device registration. For example, an Enterprise Mobility Management (EMM) server 114 may provision the certificate on the device 102. The EMM server may maintain device security posture information, e.g., jail broken or not, unauthorized app installed, etc., and may provide such posture information to the security proxy. One or more agents (secure, EMM-managed apps such as authenticator app 116) on the device 102 may act as agents to provide information relevant to security posture of the device 102, to take action on device 102 in response to a detected security breach, and/or to establish and maintain a secure VPN connection.

In various embodiments, device(s) 102 connected via secure tunnel 112 may be used to access cloud services 104. The connection to the cloud services 104 may or may not be through the security proxy 106. Cloud services 104 may be configured to redirect access requests to an identity provider 108. Device 102 once redirected may communicate with identity provider (IdP) 108 via security proxy 106 to obtain an assertion or other credential to present to the cloud service 104. In various embodiments, a certificate or other credential associated with the device 102's connection via VPN 106 may be used by the identity provider (IDP) 108 to establish the user identity associated with request, and to construct an assertion to authenticate the user to the cloud service 104. In some embodiments, a security posture check may be performed, and the redirected authentication request may be denied or not forwarded based at least in part on security posture information indicating the device 102 is not in a secure posture. The user identity certificate used to secure the secure tunnel 112 has various attributes that describe the user, such as the user's email address, or employee id. In addition, information may be obtained from systems like EMM or other services (like Active Directory or Cloud Service), or a constant value common to a group of users such as company affiliation, usage license, role etc. The IdP provides a flexible way in which customers can specify rules to transform such user identifying information into information that specific cloud service providers expect in federated identity messages in order to uniquely identify the user of that cloud service. Such transformations may include selecting one or more fields, encoding and decoding them in various formats In the example shown in FIG. 1, an access request via a VPN-connected device 102 may be processed according to the following sequence, with each number paragraph corresponding to a numbered arrow in FIG. 1:

1. A user using a VPN connected device 102 requests access to a cloud service 104. In various embodiments, the request may or may not be sent through the security proxy 106.
2. The cloud service 104 requests the user to authenticate with an identity provider 108. This is typically using a federated identity standard such as SAML.
3. The user's application (at device 102) redirects the request to the identity provider 108 via security proxy 106.
4. Based on the identity of the user within the user identity certificate used to establish the VPN connection, the identity provider 108 generates an identity assertion describing the user to the cloud-service 104. In some embodiments, security proxy 106 and identity provider 108 may be integrated into the same physical system. In some embodiments, the security proxy 106 is configured to securely pass user session context data (e.g., email address, IP address, identity certificate, application ID, to the identity provider 108. For example, when forwarding an access request from the device 102 to the identity provider 108, in some embodiments the security proxy 106 may include functionality to inject signed HTTP headers that include or otherwise indicate the context information. The assertion generated by identify provider 108 is sent back to the user's application (at device 102) to deliver to the cloud-service 104. The user's application redirects the user with this assertion to the cloud-service 104, which establishes the user's identity within the service 104 based on the assertion presented by the application (which was generated by the identity provider 108).

Managed device 102 and unmanaged device 110 can each include one or more processing devices. By way of non-limiting example, devices include smartphones, mobile devices, tablets, and desktop computers. Applications can be installed on these devices. An authenticator app, which is managed by EMM 114 can be installed on managed device 102.

In various embodiments, one or more of the above described authentication techniques may be combined with a workflow to require an approval from a third party (e.g., supervisor or other authority).

Figure 2:
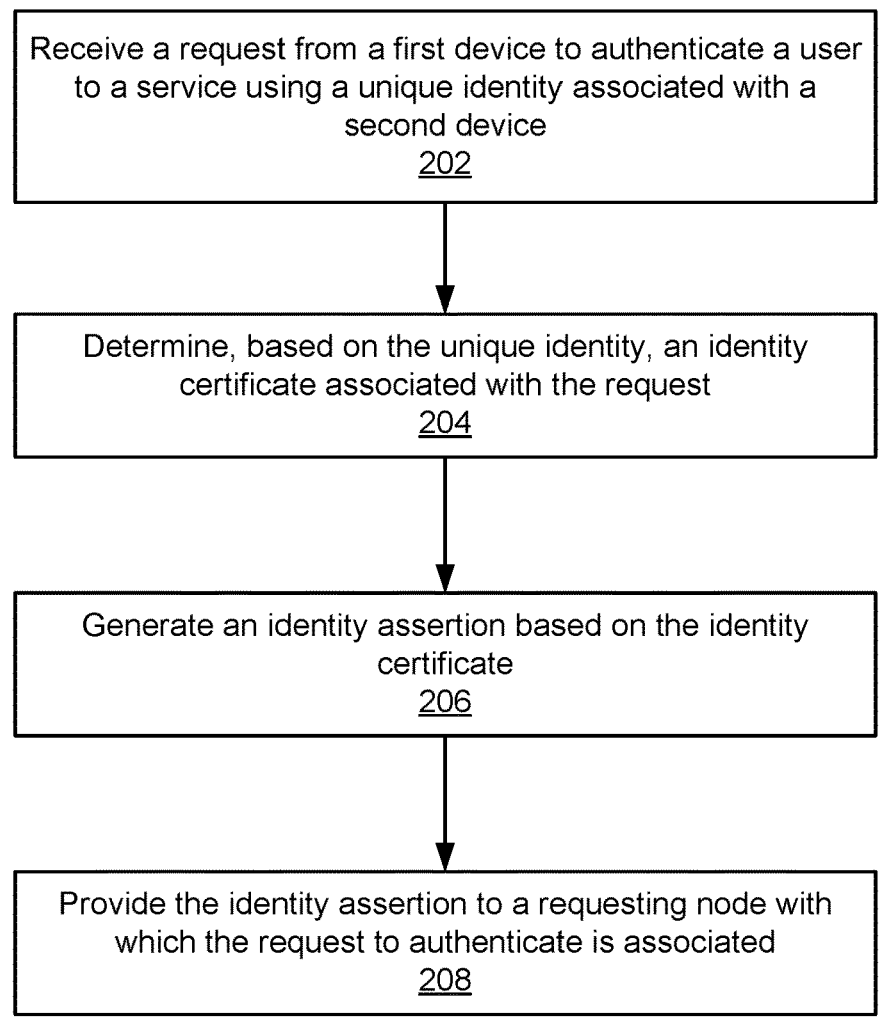
FIG. 2 is a flow chart illustrating an embodiment of a process for authenticating a user to access enterprise resources using a unique identity.

FIG. 2 is a flow chart illustrating an embodiment of a process for authenticating a user to access enterprise resources using a unique identity. Process 200 can be performed by a security proxy such as security proxy 106 of FIG. 1. Security proxy 106 may be implemented by a processor such as processor 602. Process 200 is explained with the aid of FIGS. 1 and 4. FIG. 4 illustrates an example of a graphical user interface obtained in some embodiments.

When a user using an unmanaged device 110 visits a service provider 104, the service provider redirects the user to the security proxy. The redirection corresponds to a request to authenticate a user. In various embodiments, the service provider is already federated to the security proxy (e.g., MobileIron® Access®) for user authentication by an enterprise administrator. For example, if an authenticator app is used in an authentication process, the authenticator app is trusted only if communications between the app and the security proxy is through secure tunnel 112. For example, a user opens a browser in an unmanaged device (e.g., device 110) and navigates to a cloud service provider website (such as www.serviceproviderA.com). Referring to FIG. 4, interaction page 410 loads when the user navigates to the cloud service provider's website. The displayed interaction page corresponds to redirection to the security proxy. Along with displaying the interaction page, the service provider sends a request to the security proxy to authenticate the user to the service using a unique identity.

Returning to FIG. 2, process 200 receives a request from a first device to authenticate a user to a service using a unique identity associated with a second device (202). The unique identity is also sometimes called a "unique device-associated user identity." In some embodiments, process 200 determines (whether) to trigger/proceed with a unique identity authentication process based on where the request came from. For example, process 200 proceeds with the unique identity authentication process corresponding to the steps below if the device is unmanaged (instead of managed). Whether a device is unmanaged can be indicated by device metadata such as a source IP of the request being from a location outside an intranet. The authentication process for managed devices may proceed by a different process described with the numbered arrows respect to FIG. 1 above. If the device is unmanaged, the process proceeds to present an interaction page on the device asking for a unique identity.

In the example shown in FIG. 4, referring to interaction page 420, a user enters a unique identity, "saf3ID4me." In this example, the unique identity is a string. However, the unique identity can include one or more of the following: a user's public information, a private secret, a random string, a scannable code, biometric information, a one-time password, and the like. This process assumes that a unique identity has already been established. FIG. 5 describes an example of how to establish a unique identity. Referring to FIG. 1, in various embodiments, the request is made by service provider 104 in arrow B. In various embodiments, the unique identity alone (without any other credential) is sufficient to authenticate the user. In other words, a username password combination is not needed because the unique identity alone is enough to proceed with the process.

The process determines, based on the unique identity, an identity certificate associated with the request (204). The identity certificate is used to secure a tunnel and has various attributes that describe the user. At the time the unique identity was created, it was associated with an identity certificate. The process looks up the mapping of the unique identity to the identity certificate. In some embodiments, the process performs one or more authentication or security procedures (further described with respect to FIG. 3) before proceeding.

The process generates an identity assertion based on the identity certificate (206). The identity assertion can be generated from one or more attributes obtained from a certificate presented by a secure tunnel 112 when a managed device 102 communicates with a security proxy 106. The identity assertion can be transmitted between the unmanaged device 110 and service provider 104 to authenticate the unmanaged device to access the service provider's resources in a way transparent to the user. Put another way, the unmanaged device automatically presents the identity assertion to the service provider to obtain access to the service provider's resources without needing user input beyond presenting the unique identity.

The process provides the identity assertion to a requesting node with which the request to authenticate is associated (208). If the identity assertion is recognized by the requesting node (service provider 104), then the service provider grants access. Otherwise, if the identity assertion is not recognized, then no access is provided.

Figure 3:
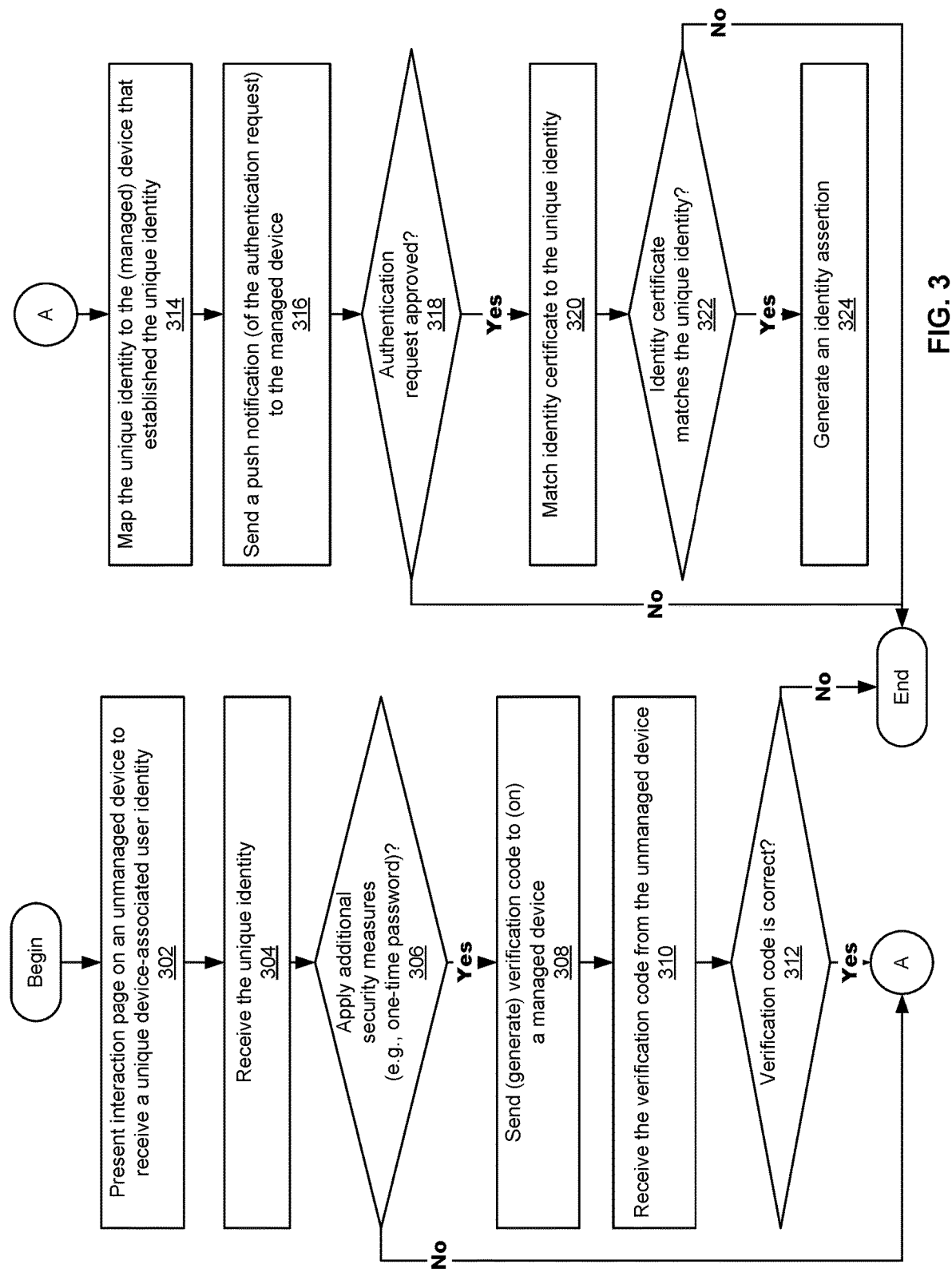
FIG. 3 is a flow chart illustrating an embodiment of a process for determining an identity certificate based on a unique identity and generating an identity assertion.

FIG. 3 is a flow chart illustrating an embodiment of a process for determining an identity certificate based on a unique identity and generating an identity assertion. Process 300 is an example of how to make determination 204 and generating an identity assertion 206 in process 200. The process can be performed by a security proxy such as security proxy 106 of FIG. 1.

The process begins by presenting an interaction page on an unmanaged device to receive a unique device-associated user identity (302). The interaction page can be provided inside a browser to query a user to enter a unique identity. Referring to FIG. 4, user interface 410 shows an example of an interaction page presented on an unmanaged device such as device 110. The interaction page may be presented in a browser or other app when a user navigates to Service Provider A's website. Interaction page 410 may include visual reminders (e.g., "Verified by Security Proxy" and icon) to guide the user to relate the unique identity established earlier in an authenticator app (e.g., app 116) in a managed device (e.g., device 102) with the unique identity that the process is now requesting.

The interaction page may be implemented in various ways based on enterprise policies and administrator configurations. In some embodiments, the interaction page includes a form asking the user to enter a string representing the unique identity. The string can be any of the public or private strings chosen at the time the unique identity was established. In some embodiments, the interaction page includes a widget that guides the user to input biometric data. For example, a user uses a camera to input a unique identity such as a Face ID® or uses a sensor to input a fingerprint. In some embodiments, the interaction page includes directions for a user to scan a scannable code (e.g., QR code) using an authenticator app on a managed app (e.g., app 116 of FIG. 1). In various embodiments, the interaction page is configured to accept one or more unique identifier forms. The process detects the type of input and processes the input according to its type.

The process receives the unique identity (304). The unique identity is input to an input field in the interaction page presented at 302. Referring to FIG. 4, interaction page 420 shows that a user has entered the unique identity "saf3ID4me" into the field "Enter ID Here" on interaction page 410. The unique identity in this example is a string, but the unique identity may be of one or more other types such as a biometric input or scannable code. In some embodiments, the unique identity is protected within the container of the browser for example by hashing the unique identity. The unique identity is processed at 314 as further described below.

The process determines whether to apply additional security measures such as a one-time password (OTP) (306). A policy (such as one defined by an administrator) can define whether additional security measures are applied. For example, an administrator can define a rule that processes unique identities after first applying a security layer such as receiving and verifying a one-time password. The additional security measures may vary from user to user or group to group. Unrecognized IP addresses or origins may be subject to heighted security measures compared with familiar IP addresses. If additional security measures are not to be applied, the process proceeds to A (314).

Otherwise, if additional security measures are to be applied, the process sends a verification code (e.g., an OTP) to a managed device (308). For example, the OTP can be sent to the device by a system performing the process (e.g., security proxy). Alternatively, the process generates a verification code on the managed device. For example, the OTP is generated on the device based on a secret shared during a registration process such as by a time-based one-time password (TOTP) algorithm. The managed device is a previously registered device managed by an EMM and associated with the unique identity. The process generates a verification code or looks-up a verification code from a list of previously-generated codes and sends this code to the managed device. Then, the user inputs the verification code in the unmanaged device (e.g., in a browser or the interaction page described earlier) to be sent to the process to verify the user's identity.

Referring to FIG. 1, the OTP is presented on authenticator app 116 of managed device 102. The user then inputs the OTP into the unmanaged device, which forwards the OTP to the process so that the process receives the verification code from the unmanaged device (310). Referring to FIG. 4, a one-time password "673019" is presented in authenticator app 430 of a managed device. The user would input this one-time password into a field in the interaction page of the unmanaged device to proceed with the process. Referring to FIG. 4, the user can input the OTP into the field shown on interaction page 450.

After receiving the verification code from the unmanaged device, the process determines whether the verification code is correct (312). The process determines whether the user-provided verification code matches the verification code that the process sent to the managed device earlier. If there is a match, then the verification code is correct. In some embodiments, the verification code expires after some time. The user can generate a new verification code in the authenticator app. Referring to authenticator app 430 of FIG. 4, a button ("Generate OTP") allows the user to generate a new verification code if there are any technical difficulties. The new verification code is generated or known by the process (security proxy).

If the verification code is incorrect, the process simply ends in some embodiments. In some embodiments, a user may re-attempt to verify. For example, the user can generate a new verification code in the authenticator app as described above (return to 308). Otherwise, if the verification code is correct at 312, the security measures that began at 306 are successfully complete, and the process proceeds to A (314).

The process maps the unique identity to the device that established the unique identity (314). The unique identity may be received in variety of ways as described earlier with respect to 304. In various embodiments, a unique identity is received from the unmanaged device. More specifically, a browser/interaction page communicates the unique identity to the process (security proxy). Referring to interaction page 420, the input of the unique identity (a string here, but may be other data such as biometric data), is transmitted by the interaction page to the process. In various embodiments, the unique identity is received from an authenticator app on a managed device. Referring to authenticator app 460, a QR code (which identifies a login session on an unmanaged device) is transmitted by the authenticator app to the system implementing the process of FIG. 3. Authenticator app 460 scans the QR code and reports to the security proxy the identity (e.g., by certificate) to be used for the session identified by the QR code. This is an example in which a QR code is displayed on an interaction page in the unmanaged device, and a user uses a managed device to scan the QR code. Authenticator app page 460 shows a state of the page in which the user has input the code in the indicated receive input field.

The process looks up the unique identity, and maps the unique identity to the device that established the unique identity. The process may retrieve stored mappings of unique identities to managed devices. A mapping can be stored at the time a managed device creates a unique identity. A process for establishing a unique identity is further described in FIG. 5. When a mapping is found, an authentication request can be sent to the managed device associated with the unique identity. If a mapping is not found, the process can simply end and/or send an error message to the user.

The process sends a push notification (of the authentication request) to the managed device (316). Referring to FIG. 1, a push notification (of an authentication request) is sent to a managed device via a secure channel established by a service provider. The managed device provides its response via secure tunnel 112 (arrow G). Referring to FIG. 4, authenticator app 470 shows a push notification notifying the user that there is an authentication request to connect to Service Provider A. The user can approve (accept) or reject (deny) the authentication request by selecting the corresponding button. The user's selection is transmitted via a secure channel to the managed device, which secure channel is established by a service provider. In various embodiments, a visual reminder can be displayed with the push notification to remind the user of the unique identifier authentication process. Although the visual reminder is not shown in every page (430, 460, 470) of the authenticator app, it may be displayed on some or all of the pages. The authenticator app reports the user's consent or denial back to the process (security proxy) over a VPN channel established by a secure tunnel (e.g., tunnel 112). In some embodiments, this step (316) is not performed. For example, if an application is not as sensitive, this step may be skipped. The level of security to use in the process can be determined by factors such as the device's location, type, or time of access request. Devices in unrecognized locations, or devices that are less secure (e.g., certain device models or types), or at unusual times may be subject to more security checks.

The process determines whether the authentication request is approved (318). If the authentication request is not approved, the process may simply end or a user can request a subsequent push notification to be sent, e.g., if a request was accidentally denied. In some embodiments, the push notification expires after a pre-determined time so that if a user does not approve (or deny) a request within the pre-determined time, the request is considered denied.

Otherwise, if the authentication request is approved, the process matches an identity certificate to the unique identity (320). The identity certificate is a certificate presented by a secure tunnel in association with communications transmitted through the tunnel. Referring to FIG. 1, the process uses the identity certificate presented by secure tunnel 112 to determine if there is a match between the unique identity and the contents of the certificate.

The process determines whether the identity certificate matches the unique identity (322). If the identity certificate does not match the unique identity, the process may end in some embodiments. In some embodiments, a user may re-attempt to verify for example by returning to 302 to re-enter or provide another unique identity.

Otherwise if the identity certificate matches the unique identity, the process generates an identity assertion (324). If the identity certificate matches the unique identity, then the process generates an identity assertion for the browser/interaction page of the unmanaged device 110 to authenticate itself with the service provider 104 (www.serviceproviderA.com). In various embodiments, the process generates the identity assertion by selecting attributes from the certificate such as a user principal name (UPN), email ID, user ID, common name (CN), employee ID, and the like. In various embodiments, the process redirects the browser/interaction page back to the service provider and the user logs in with the generated identity assertion by presenting the identity assertion. The presentation of the identity assertion may take place in the back end without requiring the user to enter any additional information. If the identity certificate does not match the unique identity, the process ends.

The following figure shows an example of how a unique identity can be established.

FIG. 5 is a flow chart illustrating an embodiment of a process for establishing a unique identity. The unique identity can be used to authenticate a user to access enterprise resources (e.g., process 200). Process 500 can be performed by a security proxy such as security proxy 106 of FIG. 1.

Process 500 can be performed in a system such as the one shown in FIG. 1 in which a user has a device 102 registered with EMM server 114. A security proxy 106 is deployed to use secure tunnel 112 for cloud services 104 access control. The user's device 102 has an authenticator app 116 to communicate with security proxy 106. In various embodiments, security proxy 106 does not accept communication from authenticator app 116 (or any other app on the managed device 102) unless the channel is authenticated using a user identity certificate issued to secure tunnel 112 by EMM 114.

Process 500 begins by prompting a user to establish a unique device-associated user identity (502). The process may prompt the user in response to events such as the user opening the authenticator app (e.g., app 116) for the first time. If the user previously skipped or declined to set up the unique identity, the process may periodically remind the user to establish the unique identity. In various embodiments, the user may request to establish the unique identity. Process 500 may instruct the authenticator app to present a user interface page with visual reminders that draw the user's attention to the concept of a unique identity. For example, words/phrases and/or an icon or logo draws the user's attention to the use of a unique identity. Referring to FIG. 4, in interaction page 410, the visual reminder is "Verified by Security Proxy" accompanied by the image of a security officer with a lock. The unique identity can be established based at least in part on user input or programmatically generated data. The user can input a string, biometric identifier (fingerprint, facial image, etc.), or other type of identifier to be used as or associated with a unique identifier. The authenticator app forwards this information to the process (security proxy).

Processor 500 receives (or creates) the unique device-associated user identity (504). The unique identity can be various formats/types or a combination of formats/types. By way of non-limiting example, unique identities can include one or more of the following: a user's public information, a private secret selected by the user, a random string, a scannable code, biometric information, and a one-time password. The unique identity can be selected by a user or generated for the user (e.g., by a security proxy or authenticator app). A user's public information has the advantage of being easily remembered by the user, but may be relatively unsafe compared with the other examples because it can be easily guessed. Examples of public information include a phone number, email address, an employee ID, and a user ID. An example of a private secret selected by the user is a string such as one that is easy for the user to remember but hard for others to guess. Process 500 can verify that the private secret complies with a policy set by the enterprise or administrator as further described below. An example of a random string is a string that is generated by security proxy 106 or authenticator app 116. This has the advantage of being more secure than a user-selected private secret if the user is not good at selecting secure strings. An example of a scannable code is a QR code, which can be a unique code generated by the security proxy 106 or authenticator app 116 for a specific user or user and device combination. The authenticator app 116 may be configured to store the private secret, random string, or scannable code for the user to recall as needed. Examples of biometric information includes a thumb print or face print. Biometric information has the advantage of being harder to forge/guess. However, not all devices used by the user may support input of biometric information. For example, devices that do not have fingerprint sensors or cameras would not be able to be used to accept or transmit the unique identity. An OTP can be generated by an authenticator app, and may be used in conjunction with other types of unique identities such as a user's public information.

Process 500 verifies that the unique device-associated user identity complies with policies (506). In some embodiments, an enterprise or administrator can define a policy/standard to govern permitted unique identifiers. For example, for user-selected private secrets, the process may check that the string is not easily guessed, does not include public information, unique for the enterprise, or the like.

Process 500 associates the unique device-associated user identity with the user's one or more managed devices (508). Referring to FIG. 1, the unique identity is associated with the managed device 102 including the authenticator app 116 that was used to establish the unique identity as well as one or more other managed devices associated with the same user. Put another way, one unique identity can be associated with multiple managed devices. Alternatively, each of a user's managed devices can have a respective (different) unique identity.

Process 500 associates the unique device-associated user identity with the user's identity certificate (510). The user's identity certificate is the user's identity for the enterprise, e.g., a certificate that is presented by a device to obtain access to enterprise resources (access to cloud services 104). As described above, an identity certificate is used to secure the secure tunnel 112 and has various attributes that describe the user, such as the user's email address, or employee ID. The unique identity is associated with the identity certificate so that when a user presents a unique identity, the matching identity certificate found, and the identity certificate is presented to the service provider on behalf of the user to access the service provider.

In various embodiments, to prevent leaking of information about a user's unique identity, during the process 500 to establish the unique identity, communications are made only through a mutually authenticated secure channel established by the secure tunnel 112. This prevents a malicious user from using the application to guess the secure unique identity of other users in the company.

In various embodiments, when a user enters a unique identity, the unique identity protected. In the process 500 of establishing the unique identity, the unique identity is protected within the container of the authenticator app. In the process 200 of providing a unique identity to obtain access to enterprise resources, the unique identity is protected within the container of the browser/interaction page. This ensures that the unique identity is not exposed to the cloud service 104. The unique identity can be protected by a variety of security techniques including applying a secure hashing algorithm on top of the unique identity after it is entered (whether in registration phase 500 or authentication phase 200).

Techniques for asserting a mobile device-associated in an enterprise authentication system to access a resource from a device other than the mobile device is disclosed. In various embodiments, these techniques are transparent to the end user in determining the device posture to control access for public mobile apps to corporate resources in cloud or on-premises. Unlike conventional methods that use an OTP to establish a user's identity and stores a cookie in the browser to enable easy login for the next few days without needing to validate the user, the unique identity is more securely established and authenticated and does not need to be refreshed frequently. Unlike conventional single sign on techniques that grant access to resources when a username and password is input to a variety of platforms, the unique identity disclosed here has been authenticated in a more secure manner. In one aspect, the unique identity is more securely established and authenticated because the process involves an enterprise mobile management server. In another aspect, the unique identity is linked to an identity certificate. The unique identity does not require a username and password combination and can be easier to remember or use. In particular, unlike conventional single sign on, the unique identity is used in various embodiments to look up an identity certificate and generate an identity assertion. Unlike conventional apps that use QR codes to connect users by linking a browser to a session, the scannable code described here links a browser on an unmanaged device to a managed device. These techniques improve security and usability by having users verify user identity remotely on a high secure endpoint using a unique identity.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system comprising:
a communication interface;
a processor coupled to the communication interface and configured to:
receive, via the communication interface and from a first device, a request to authenticate a user to a service using a unique identity associated with a second device;
determine, based at least in part on the unique identity, an identity certificate associated with the request including by:
presenting an interaction page on an unmanaged device to receive the unique identity,
mapping the unique identity to a managed device that established the unique identity, and
in response to receiving approval from the managed device,
matching an identity certificate to the unique identity;
generate an identity assertion based at least in part on the identity certificate; and
provide the identity assertion via the communication interface to a requesting node with which the request to authenticate is associated;
wherein the first device is not managed by an enterprise mobile management server and the second device is managed by the enterprise mobile management server, and
the determination of the identity certificate includes, prior to mapping the unique identity to the managed device: at least one of: sending a verification code to the managed device and generating a verification code at the managed device, and receiving a verification code from the unmanaged device matching the verification code sent to the managed device.

2. The system of claim 1, wherein the requesting node is a cloud service provider.

3. The system of claim 1, wherein the unique identity identifies an associated managed device.

4. The system of claim 1, wherein the identity certificate is associated with a device managed by an enterprise mobile management server.

5. The system of claim 1, wherein the unique identity is unaccompanied by a credential.

6. The system of claim 1, wherein the unique identity identifies a user authenticated to the unique identity.

7. The system of claim 1, wherein the determination of the identity certificate includes:
sending a push notification to the managed device, and
the approval is received in response to the push notification.

8. The system of claim 1, wherein the interaction page includes a visual reminder of a process for authenticating a unique identity.

9. The system of claim 1, where the unique identity is hashed upon entry by a user.

10. The system of claim 1, wherein the identity assertion is generated based at least in part on attributes in the identity certificate.

11. The system of claim 1, wherein the processor is further configured to perform a one-time authentication.

12. The system of claim 1, wherein the processor is further configured to authenticate the unique identity using a biometric identifier, and the identity certificate is determined in response to authenticating the unique identity.

13. The system of claim 1, wherein the processor is further configured to, prior to receiving the request to authenticate the user:
associate the unique identity with managed devices; and
associate the unique identity with the identity certificate.

14. The system of claim 1, wherein the processor is further configured to create the unique identity.

15. The system of claim 1, wherein the processor is further configured to associate a login session identified by a received scannable code with the identity certificate.

16. A method comprising:
receiving from a first device a request to authenticate a user to a service using a unique identity associated with a second device;
determining, based at least in part on the unique identity, an identity certificate associated with the request including by:
presenting an interaction page on an unmanaged device to receive the unique identity,
mapping the unique identity to a managed device that established the unique identity, and
in response to receiving approval from the managed device, matching an identity certificate to the unique identity;
generating an identity assertion based at least in part on the identity certificate; and
providing the identity assertion to a requesting node with which the request to authenticate is associated;
wherein the first device is not managed by an enterprise mobile management server and the second device is managed by the enterprise mobile management server, and
the determination of the identity certificate includes, prior to mapping the unique identity to the managed device: at least one of: sending a verification code to the managed device and generating a verification code at the managed device, and receiving a verification code from the unmanaged device matching the verification code sent to the managed device.

17. A computer program product embodied in a non-transitory computer readable storage medium and comprising computer instructions for:
- receiving from a first device a request to authenticate a user to a service using a unique identity associated with a second device;
- determining, based at least in part on the unique identity, an identity certificate associated with the request including by:
  - presenting an interaction page on an unmanaged device to receive the unique identity,
  - mapping the unique identity to a managed device that established the unique identity, and
  - in response to receiving approval from the managed device, matching an identity certificate to the unique identity;
- generating an identity assertion based at least in part on the identity certificate; and
- providing the identity assertion to a requesting node with which the request to authenticate is associated;
- wherein the first device is not managed by an enterprise mobile management server and the second device is managed by the enterprise mobile management server, and
- the determination of the identity certificate includes, prior to mapping the unique identity to the managed device: at least one of: sending a verification code to the managed device and generating a verification code at the managed device, and receiving a verification code from the unmanaged device matching the verification code sent to the managed device.

* * * * *